United States Patent
Okuda et al.

(10) Patent No.: US 10,634,278 B2
(45) Date of Patent: Apr. 28, 2020

(54) MONITOR STAND

(71) Applicant: EIZO Corporation, Ishikawa (JP)

(72) Inventors: Masahiro Okuda, Ishikawa (JP); Hidekazu Hogo, Ishikawa (JP)

(73) Assignee: EIZO Corporation, Ishikawa (JP)

( * ) Notice: Subject to any disclaimer, the term of this patent is extended or adjusted under 35 U.S.C. 154(b) by 0 days.

(21) Appl. No.: 16/302,754

(22) PCT Filed: May 1, 2017

(86) PCT No.: PCT/JP2017/017188
§ 371 (c)(1),
(2) Date: Nov. 19, 2018

(87) PCT Pub. No.: WO2017/199744
PCT Pub. Date: Nov. 23, 2017

(65) Prior Publication Data
US 2019/0293229 A1 Sep. 26, 2019

(30) Foreign Application Priority Data

May 19, 2016 (JP) .................................. 2016-100940

(51) Int. Cl.
*F16M 11/00* (2006.01)
*F16M 11/28* (2006.01)
(Continued)

(52) U.S. Cl.
CPC .............. *F16M 11/28* (2013.01); *F16M 11/10* (2013.01); *F16M 11/18* (2013.01); *G09F 9/00* (2013.01);
(Continued)

(58) Field of Classification Search
CPC ........................... F16M 11/00; F16M 11/2021
(Continued)

(56) References Cited

U.S. PATENT DOCUMENTS 7,424,991 B2 * 9/2008 Kim .................... F16C 11/0619
248/121
7,460,363 B2 * 12/2008 Teng ...................... F16M 11/28
248/125.1
(Continued)

FOREIGN PATENT DOCUMENTS

CN 202312418 U 7/2012
JP 2004-271595 A 9/2004
(Continued)

OTHER PUBLICATIONS

Extended European Search Report dated Apr. 29, 2019, including the Supplementary European Search Report and the European Search Opinion, in connection with corresponding EP Application No. 17799174.2 (6 pgs.).
(Continued)

*Primary Examiner* — Steven M Marsh
(74) *Attorney, Agent, or Firm* — Maier & Maier, PLLC

(57) ABSTRACT

A monitor stand with a support portion supporting a monitor; a base contacting a placing plane; and a support pillar connecting the support portion and the base. The support pillar includes a plurality of support pillar members provided to overlap one another and the plurality of support pillar members being configured to be slidable one another. The support portion is provided in a first support pillar member which is one of the plurality of the support pillar members. The support pillar includes an interlocking portion configured to extend and shorten the support pillar by sliding the plurality of the support pillar members one another.

19 Claims, 12 Drawing Sheets

(51) Int. Cl.
  *F16M 11/10* (2006.01)
  *F16M 11/18* (2006.01)
  *G09F 9/00* (2006.01)
  *H04N 5/64* (2006.01)

(52) U.S. Cl.
  CPC ......... *H04N 5/64* (2013.01); *F16M 2200/041* (2013.01); *F16M 2200/048* (2013.01)

(58) Field of Classification Search
  USPC .............................. 248/125.1, 917, 919, 920
  See application file for complete search history.

(56) References Cited

U.S. PATENT DOCUMENTS

| | | | | |
|---|---|---|---|---|
| 7,712,711 B2* | 5/2010 | Jang | ..................... | F16M 11/105 |
| | | | | 248/125.8 |
| 7,869,202 B2* | 1/2011 | Chiang | ................. | G06F 1/1601 |
| | | | | 248/917 |
| 8,079,554 B2* | 12/2011 | Sui | ......................... | F16M 11/22 |
| | | | | 248/125.1 |
| 9,046,216 B2* | 6/2015 | Lu | .......................... | F16M 11/10 |
| 2006/0117623 A1* | 6/2006 | Watanabe | ............ | F16M 11/041 |
| | | | | 40/606.15 |
| 2006/0175476 A1* | 8/2006 | Hasegawa | ............ | F16M 11/105 |
| | | | | 248/125.1 |
| 2006/0185563 A1 | 8/2006 | Sweere et al. | | |
| 2007/0145203 A1 | 6/2007 | Takada et al. | | |
| 2007/0146979 A1 | 6/2007 | Chen et al. | | |
| 2010/0006716 A1* | 1/2010 | Yen | ........................ | F16M 11/10 |
| | | | | 248/125.1 |
| 2012/0119040 A1 | 5/2012 | Ergun et al. | | |

FOREIGN PATENT DOCUMENTS

| | | |
|---|---|---|
| JP | 2007-171966 A | 7/2007 |
| JP | 2008-033004 A | 2/2008 |
| JP | 2010-019893 A | 1/2010 |
| JP | 2010-020153 A | 1/2010 |
| JP | 4578548 B2 | 11/2010 |
| JP | 2013-534341 A | 9/2013 |

OTHER PUBLICATIONS

Office Action dated Jun. 4, 2019 in corresponding Russian Application No. 2018141205/12(068629); 11 pages including English-language translation.
International Search Report dated Jul. 25, 2017 of corresponding International Application No. PCT/JP2017/017118; 2 pgs.

* cited by examiner

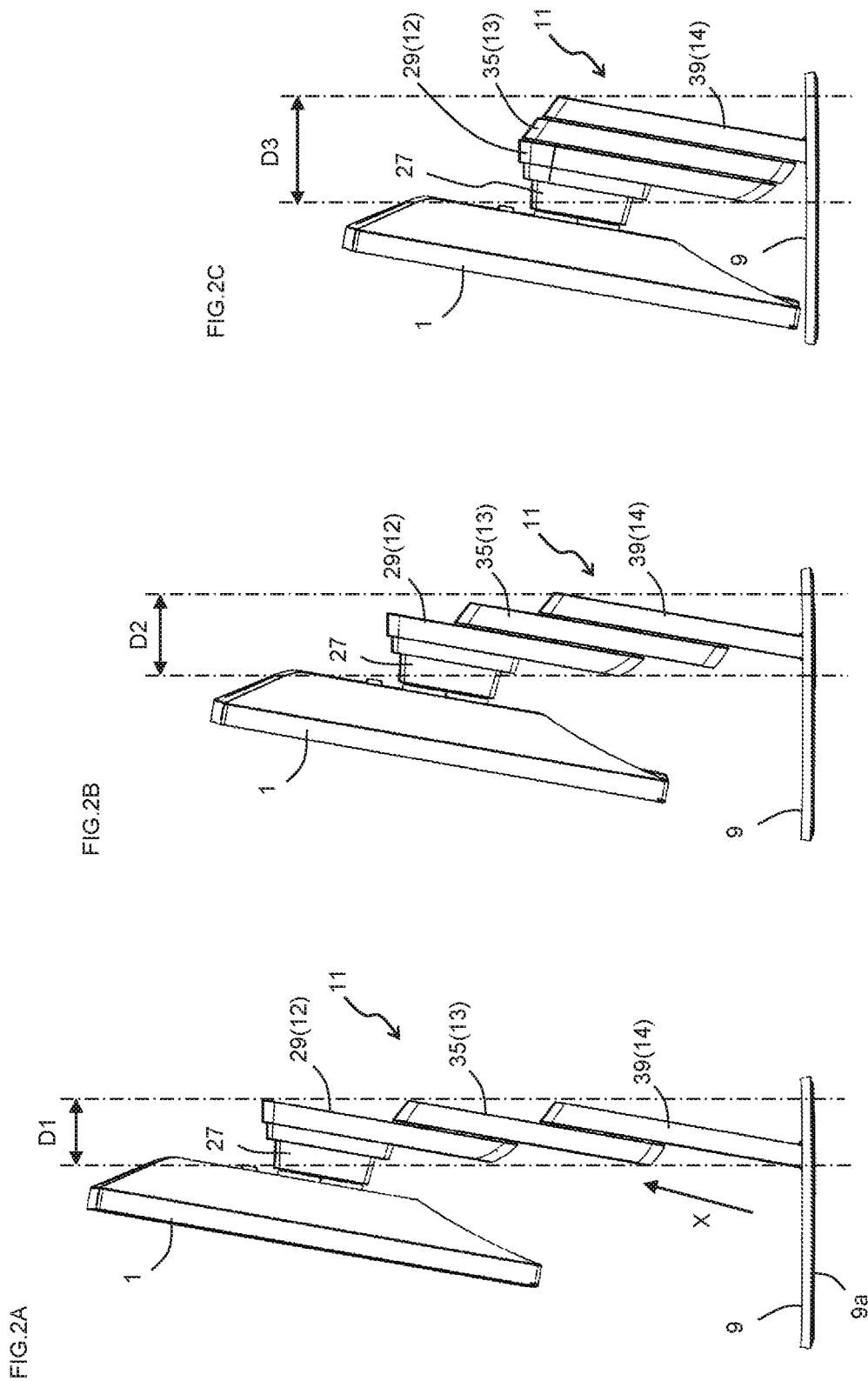

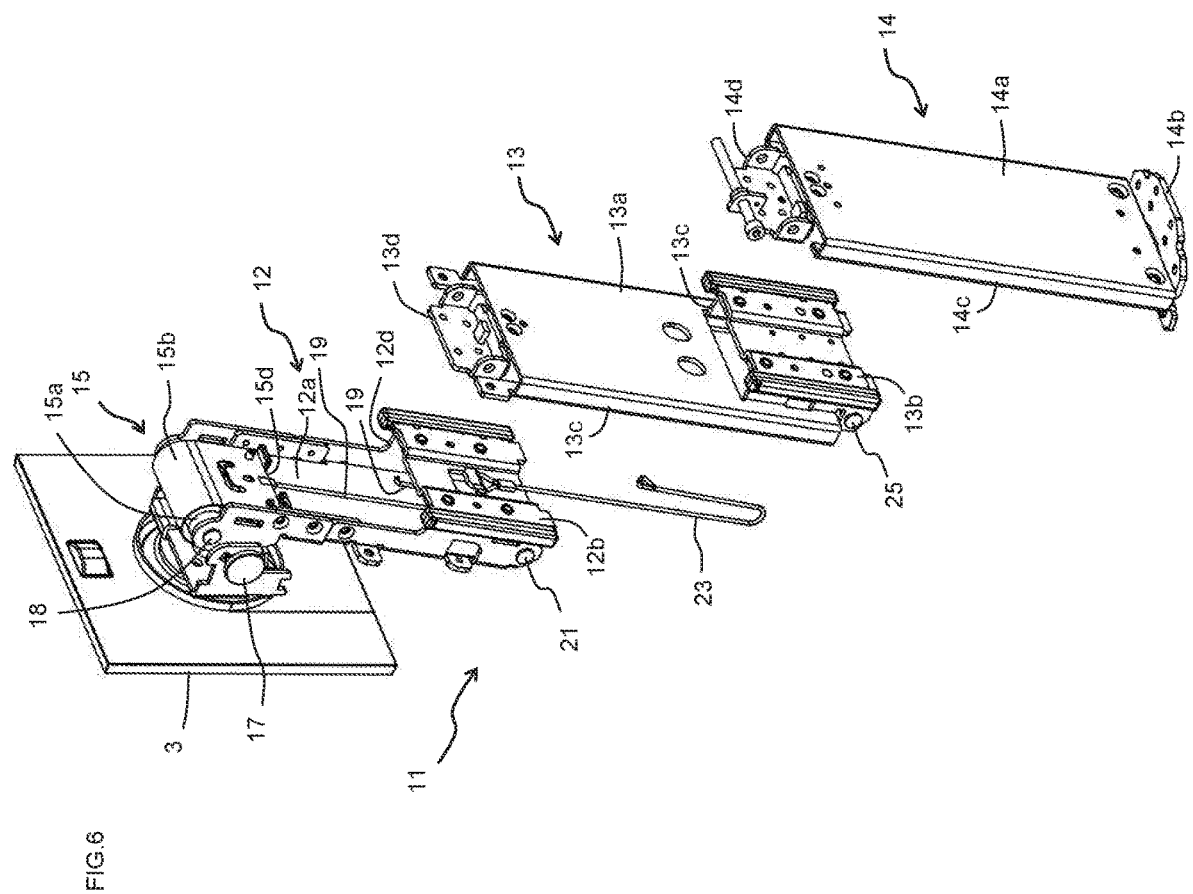

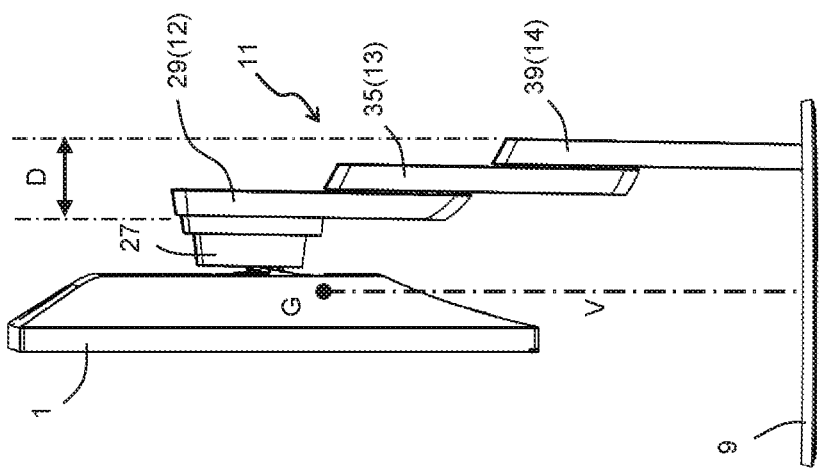
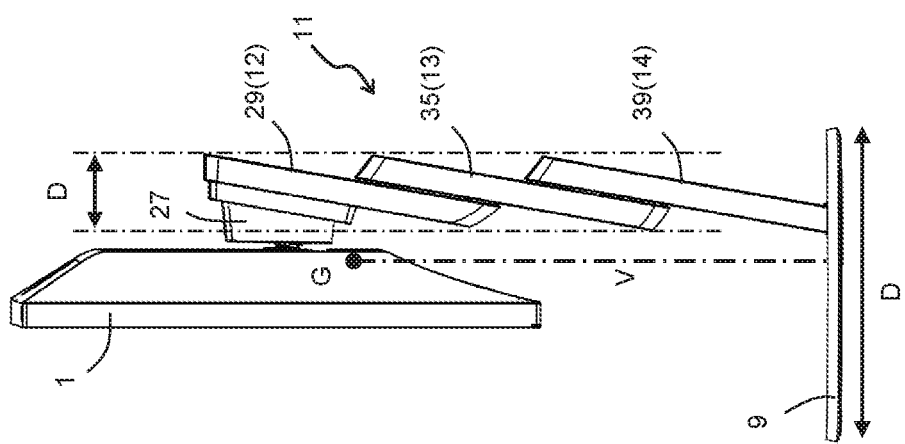

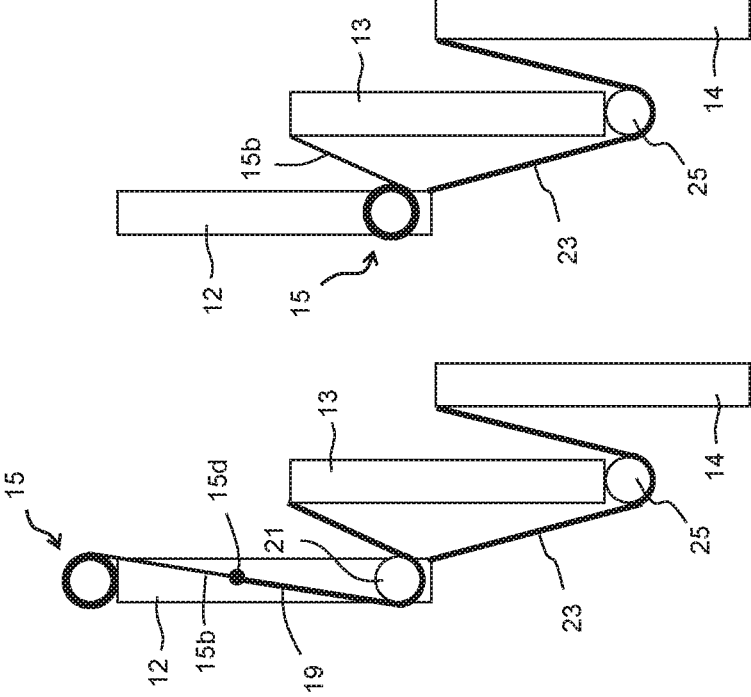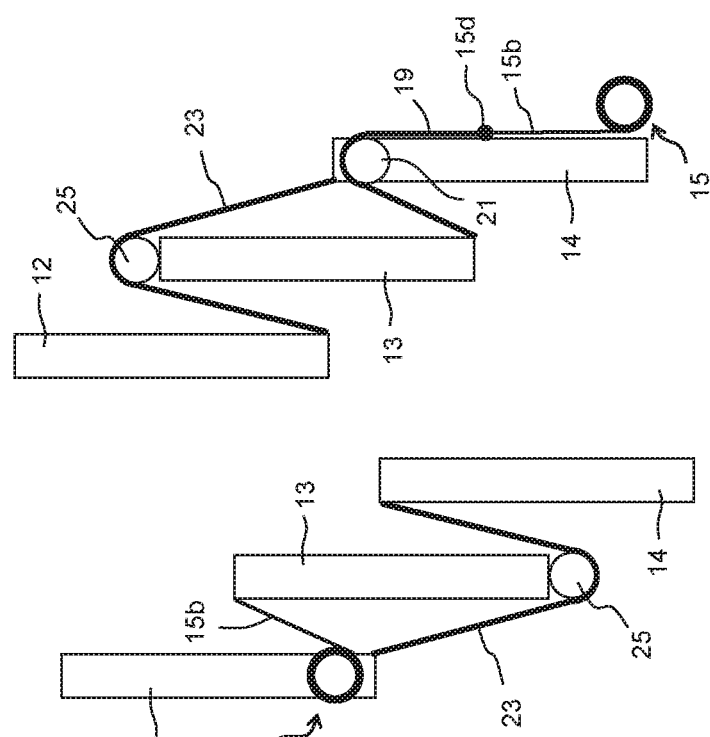

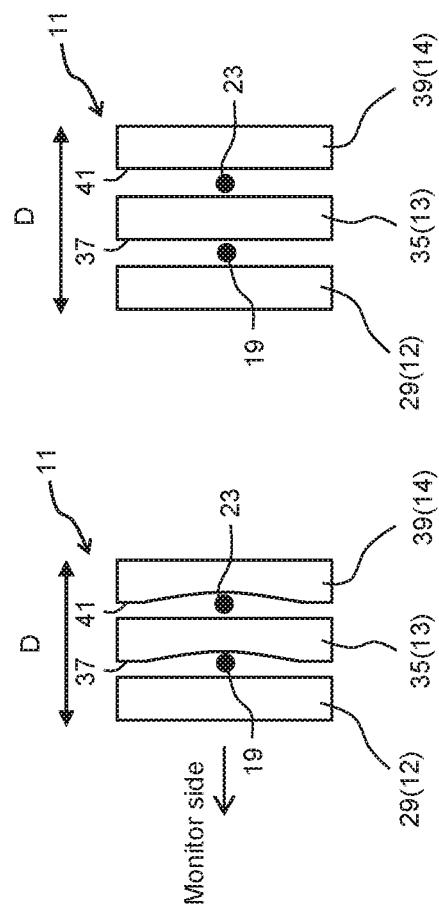
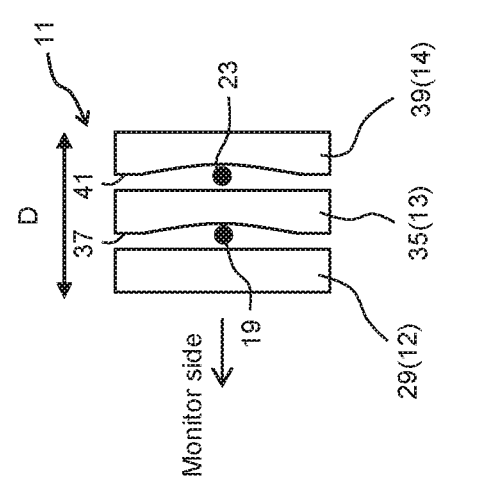
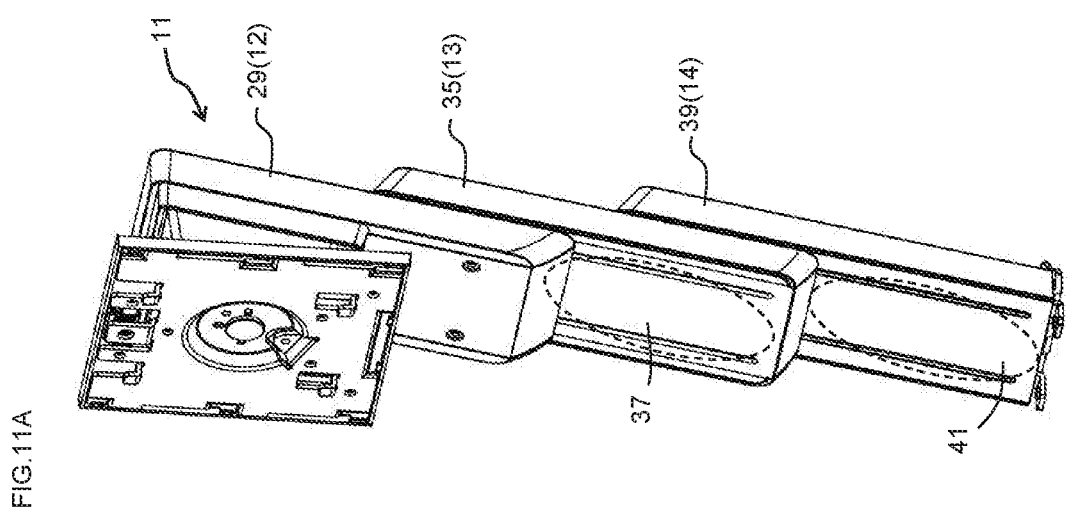

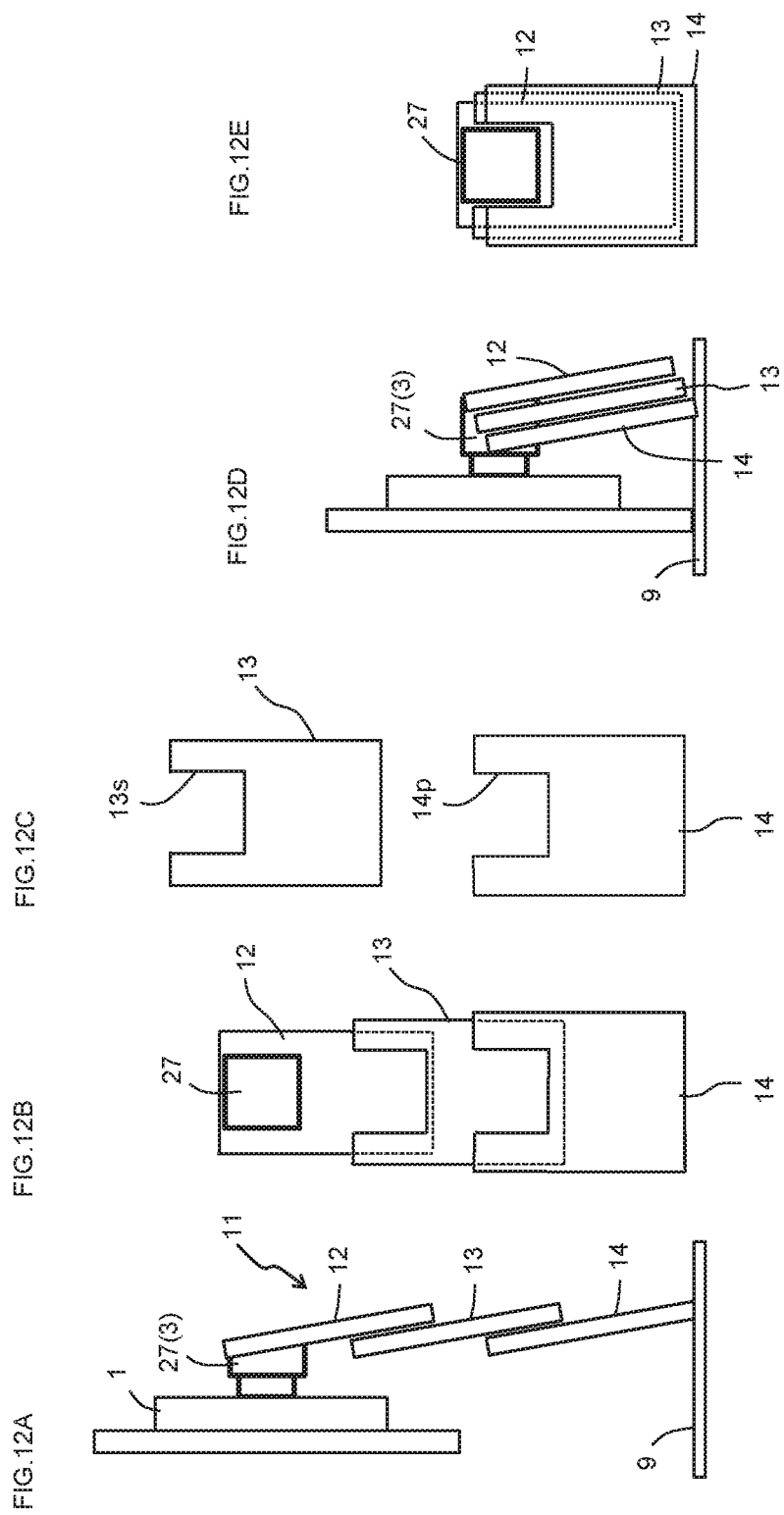

MONITOR STAND

TECHNICAL FIELD

The present invention relates to a monitor stand capable of supporting a monitor in an ascendable manner.

BACKGROUND ART

Patent Literature 1 discloses a monitor stand capable of keeping a position of a monitor at a desired position and capable of adjusting the monitor to a low position. Specifically, in the monitor stand of Patent Literature 1, a support member 6b is fixed to a planar member 6a in contact with a placement surface, and a connecting member 8 is supported so as to be movable in the vertical direction with respect to a support member 6b, and a slider 10a is movably supported with respect to the connecting member 8, and the monitor is fixed to the slider 10a. When a vertical force is applied to the monitor, the slider 10a and the connecting member 8 move in the vertical direction, whereby the monitor can be raised and lowered.

CITATION LIST

Patent Literature

[Patent Literature 1] Japanese Patent No. 4578548

SUMMARY OF THE INVENTION

Technical Problem

In the monitor stand of Patent Literature 1, it is possible to adjust the monitor to the low position. However, when the monitor is adjusted to the low position, the support member 6b and the connecting member 8 can be seen from an upper side of the monitor, and an appearance of the monitor stand is impaired.

The present invention has been made in view of the foregoing, and an object thereof is to provide a monitor stand in which a support pillar cannot be seen from the upper side of the monitor even when the monitor is adjusted to the low position.

Solution to Problem

The present invention provides a monitor stand comprising: a support portion supporting a monitor; a base contacting a placing plane; and a support pillar connecting the support portion and the base. The support pillar includes a plurality of support pillar members provided to overlap one another and the plurality of support pillar members being configured to be slidable one another. The support portion is provided in a first support pillar member which is one of the plurality of the support pillar members. The support pillar includes an interlocking portion configured to extend and shorten the support pillar by sliding the plurality of the support pillar members one another. The interlock portion is configured to keep a position of the monitor at a desired position by an urging force of a constant load spring which includes a spring portion.

The monitor stand of the present invention raises and lowers the monitor by sliding the plurality of the support pillar members provided to overlap with one another. And even if the length of each support pillar member is shortened, a movable range of the monitor can be sufficiently secured. As a result, even when the monitor is in a lower limit position, the support pillar cannot be seen from the upper side of monitor.

Various embodiments are described below. The embodiments below can be combined with one another.

Preferably, the support pillar is configured so that a depth of the support pillar decreases with an extension of the support pillar.

Preferably, the interlock portion is configured to interlock the plurality of the support pillar members so that the first support pillar member is positioned higher than other support pillar members.

Preferably, the interlock portion is configured so that sliding distances between any adjacent two support pillar members of the plurality of the support pillar members are equal when the monitor is raised and lowered.

Preferably, the plurality of the support pillar members include the first support pillar member, a second support pillar member, and a third support pillar member in order from the monitor.

Preferably, the constant load spring is supported by the first support pillar member. An open end of the spring portion is connected directly or via another component to a second support pillar member which is provided adjacent to the first support pillar member.

Preferably, the support portion is connected to the first support pillar member via a tilt hinge, and the constant load spring is supported in a vicinity of the tilt hinge.

Preferably, the open end of the spring portion is connected to the second support pillar member via a first interlock member including one end and the other end. The one end of the first interlock member is connected to the open end of the spring portion. The other end of the first interlock member is connected to the second support pillar member. The first interlock member is turned at a first turning portion provided in the first support pillar member.

Preferably, the first turning portion is provided in a vicinity of a lower end of the first support pillar member.

Preferably, the monitor stand further comprising: a third support pillar member fixed to the base, the third support pillar member provided adjacent to the second support pillar member; and a second interlocking member including one end and the other end. The one end of the second interlocking member is connected to the first support pillar member, the other end of the second interlocking member is connected to the third support pillar member. The second interlocking member is turned at a second turning portion provided in the second support pillar member.

Preferably, the second turning portion is provided in a vicinity of a lower end of the second support pillar member.

Preferably, the support pillar is inclined to the base. The support pillar is fixed to the base in a vicinity of the position where the base crosses a vertical line passing through a center of gravity of a structure consisting of the monitor stand and the monitor.

Preferably, the interlock portion is configured to interlock the plurality of the support pillar members so that the support pillar member closest to the monitor in the plurality of the support pillar members is positioned at the highest position, and the support pillar member closest to the base in the plurality of the supporting pillar members is positioned at the lowest position.

Preferably, the support pillar is inclined to the base, in a state where the monitor is in an upper limit position, a line connecting uppermost points on a back side of each of the support pillar members is perpendicular to the base.

Preferably, the support pillar is inclined to the base. An inclination angle of the support pillar with respect to a vertical direction is 0.8 to $1.2 \times (\tan^{-1}(T/L))$. T is a thickness of the support pillar member closest to the base in the plurality of the support pillar members. L is a stroke of the support pillar member that is the second closest to the base in the plurality of the support pillar members with respect to the support pillar member closest to the base in the plurality of the support pillar members.

Preferably, when defining a thickness of the support pillar member closest to the base in the plurality of the support pillar members as a first thickness and a thickness of all the other support members as a second thickness. A ratio of the second thickness with respect to the first thickness is 0.5 to 2.

Preferably, when defining a full length of the support pillar member closest to the base in the plurality of the support pillar members as a first length and a full length of all the other support members as a second length. A ratio of the second length with respect to the first length is 0.5 to 2.

Preferably, the plurality of the support pillar members are plate-shaped.

Another embodiment is to provide a monitor stand comprising: a support portion supporting a monitor; a base contacting a placing plane; and a support pillar connecting the support portion and the base. The support pillar includes a plurality of support pillar members provided to overlap one another and the plurality of support pillar members are configured to slide one another. The support portion is provided in a first support pillar member which is one of the plurality of the support pillar members. The support pillar includes an interlocking portion configured to extend and shorten the support pillar by sliding the plurality of the support pillar members. The support pillar is configured so that a depth of the support pillar decreases with an extension of the support pillar.

According to above configuration, the depth of the support pillar decreases with a rise of the monitor, the support pillar becomes inconspicuous, and the appearance of the monitor stand improves. With the conventional support pillar comprising telescope structure, the support pillar is conspicuous especially when the monitor is in a high position, since the depth of the support is constant regardless of the position of the monitor. On the other hand, in the present embodiment, since the depth of the support pillar decreases with the rise of the monitor, the support pillar is inconspicuous even when the monitor is in the high position. Thus, an effect of improving appearance is remarkable in the present embodiment. In the specification of the present application, the term "the depth of the support pillar" is a length in a depth direction of an image obtained by projecting the support pillar in a direction perpendicular to the bottom surface of the base. The bottom surface of the base corresponds to the base's surface contacting a placing surface of the desk when the monitor stand is placed on the desk. The direction perpendicular to the bottom surface of the base corresponds to the up-down direction in FIG. 2. The depth direction corresponds to the left-right direction in FIG. 2.

BRIEF DESCRIPTION OF THE DRAWINGS

FIG. 1A shows a state in which a cover is attached to a support portion 3 and a support pillar 11. FIG. 1B shows a state in which the cover of the support portion 3 and the support pillar 11 is removed.

FIGS. 2A to 2C are right-side views showing a state in which a first support pillar member 12 and a second support pillar member 13 slide equally at the same time when the monitor 1 moves up and down. FIG. 2A shows a state in which the monitor 1 is at an upper limit position. FIG. 2B shows a state in which the monitor 1 is in a middle position. FIG. 2C shows a state where the monitor 1 is in a lower limit position.

FIG. 3A shows a state in which the cover is attached to the support portion 3 and the support pillar 11. FIG. 3B shows a state in which the cover of the support portion 3 and the support pillar 11 is removed.

FIG. 4A shows a state in which the cover is attached to the support portion 3 and the support pillar 11. FIG. 4B shows a state in which the cover of the support portion 3 and support pillar 11 is removed.

FIG. 6 is an exploded perspective view of the support portion 3 and the support pillar 11 as seen from the rear side.

FIGS. 7A to 7B are right-side views for explaining an effect of tilting the support pillar 11. FIG. 7A shows a state in which the support pillar 11 is inclined. FIG. 7B shows a state in which the support pillar 11 extends in the vertical direction.

FIGS. 10A to 10D are conceptual diagrams showing a configuration of an interlocking part of the first to fourth embodiments.

FIG. 11A is a perspective view of the support portion 3 and the support pillar 11 as seen from the front in a state where the cover is attached to the support portion 3 and the support pillar 11. FIGS. 11B to 11C are views as seen in a direction of arrow X in FIG. 2A. FIG. 11B shows a state where an interference avoidance shape is provided in front covers 37, 41. FIG. 11C shows a state where the interference avoidance shape is not provided in the front covers 37, 41.

FIGS. 12A to 12E show a state in which a monitor 1 is attached to a monitor stand according to a fifth embodiment of the present invention. FIG. 12A is a right-side view in a state where the support pillar 11 is extended. FIG. 12B is a front view in the same state as FIG. 12A. FIG. 12C is a front view of the second support pillar member 13 and the third support pillar member 14 extracted from FIG. 12B. FIG. 12D is a right-side view with the support pillar 11 shortened. FIG. 12E is a front view in the same state as FIG. 12D.

DESCRIPTION OF EMBODIMENTS

Various embodiments are described below. The various features shown in the embodiments below can be combined with one another. Also, embodiments are established independently for each feature.

1. First Embodiment

A monitor stand according to a first embodiment of the present invention is described with reference to FIGS. 1A to 9 and 10A.

Overall Configuration

Figure 1B:
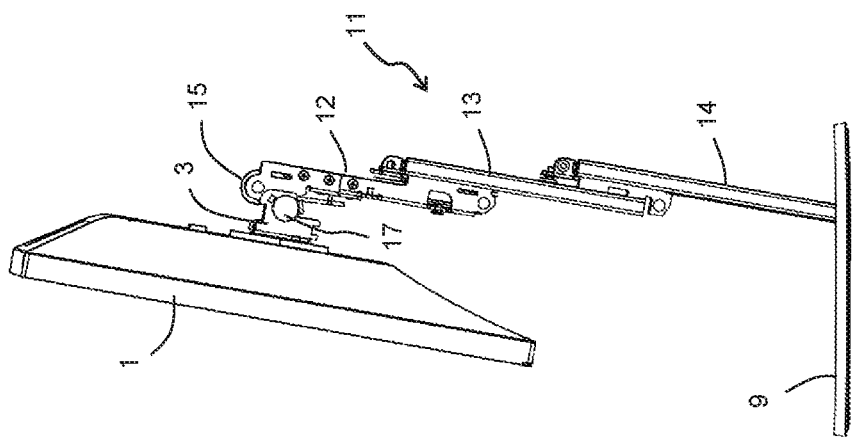
FIGS. 1A to 1B show a state in which a monitor 1 is attached to a monitor stand according to a first embodiment of the present invention.
Figure 1A:
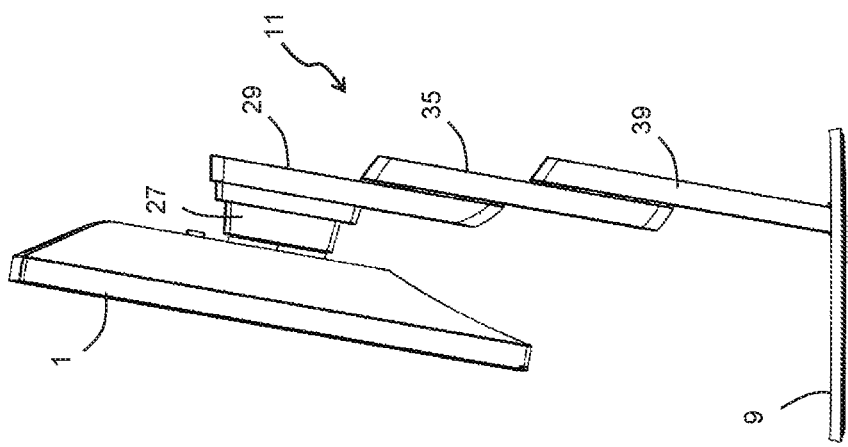
Figure 3B:
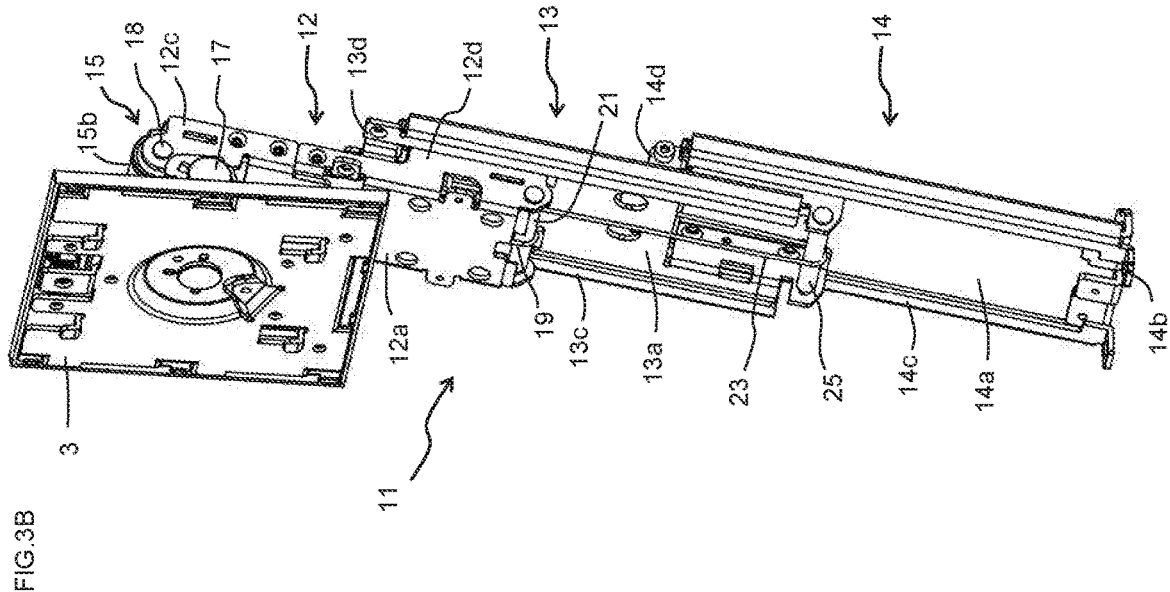
FIGS. 3A to 3B are perspective views of the support portion 3 and the support pillar 11 as seen from a front side.
Figure 3A:
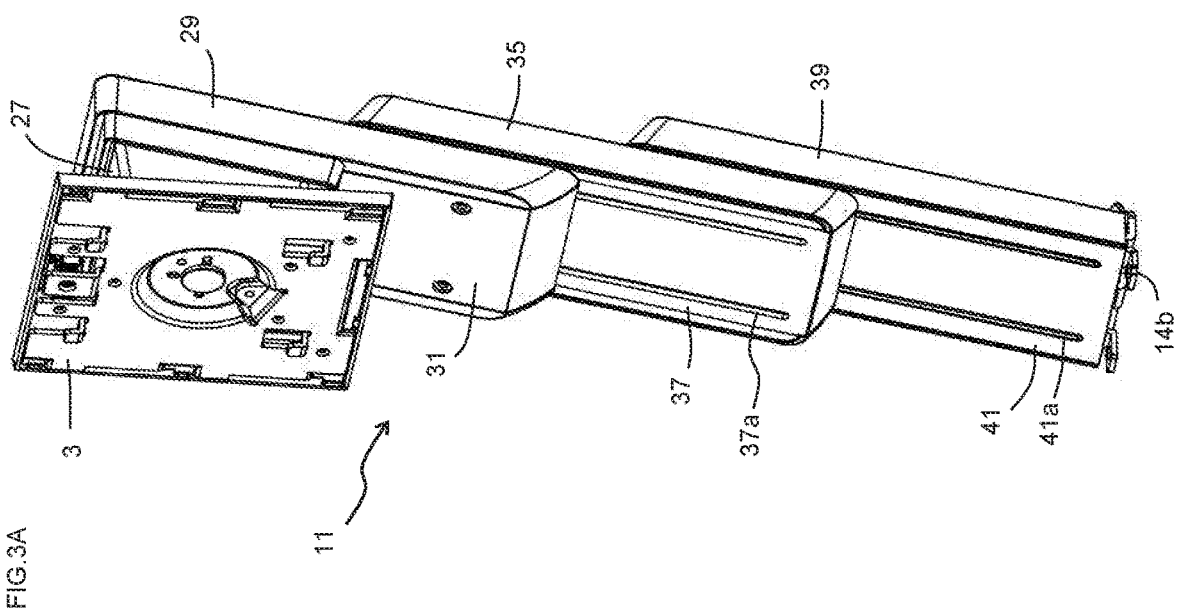
Figure 4B:
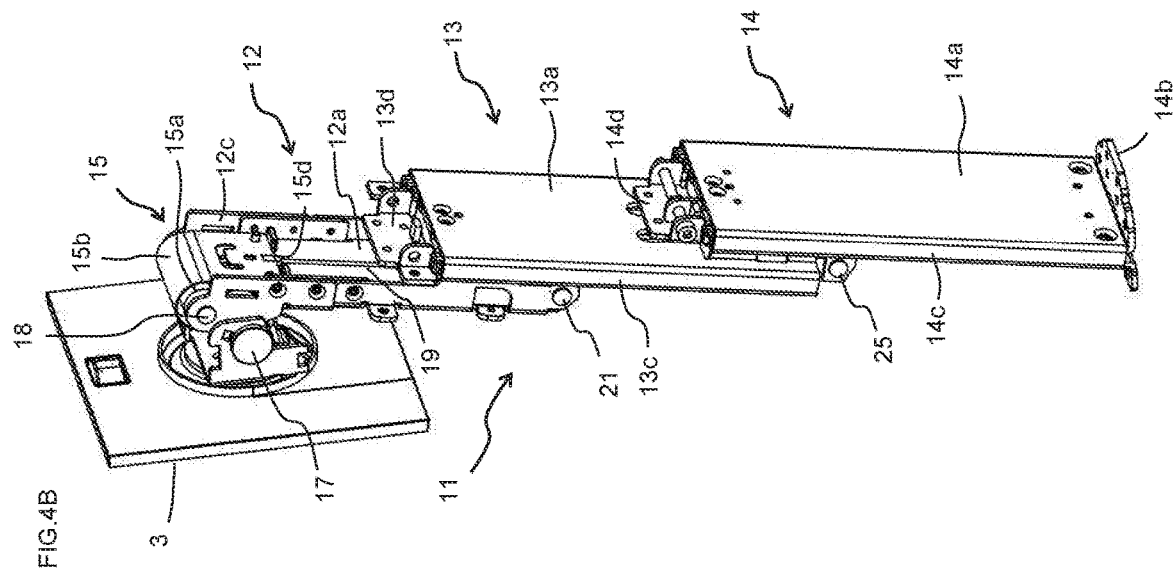
FIGS. 4A to 4B are perspective views of the support portion 3 and the support pillar 11 as seen from a rear side.
Figure 4A:
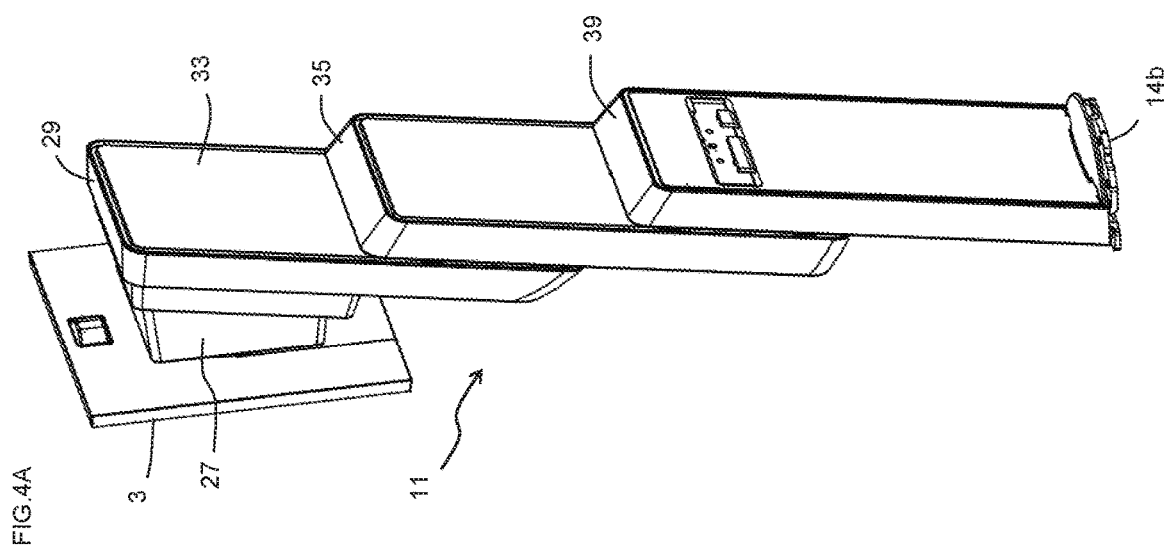

As shown in FIGS. 1A to 1B, the monitor stand of the present embodiment includes a support portion 3 for supporting a monitor 1, a base 9 for contacting a placement surface, and a support pillar 11 for connecting the support portion 3 with the base 9. The support pillar 11 includes first to third support pillar members 12 to 14. The first to third support pillar members 12 to 14 are provided to overlap with one another and are configured to be slidable with one another. The support portion 3 is provided closest to the monitor 1. The support pillar 11 includes an interlocking part built in, and the interlocking part raises and lowers the monitor 1 by sliding the first to third support pillar members 12 to 14 one another. The interlocking part makes it possible to position the monitor 1 at a desired position by an urging force of a constant load spring 15 which includes a spring portion 15b. The spring portion 15b is wound. Then, the constant load spring is a spring constantly reciprocating with constant load irrespective of pulled out length of the spring. Also, the interlocking part is configured to interlock the first to third support pillar members 12 to 14 so that the first support pillar member 12 is higher than the second support pillar member 13 and the third support pillar member 14. As shown in FIG. 2A to 2C, the support pillar 11 is configured so that a depth of the support pillar 11 decreases with an extension of the support pillar 11.

Support Portion 3

As shown in FIGS. 3 to 6, the support portion 3 is connected to the first support pillar member 12 via a tilt hinge 17, and an angle of the support portion 3 with respect to the first support pillar member 12 is adjustable. In such a configuration, the monitor stand can adjust the angle of the monitor 1 with respect to the support pillar 11. The support portion 3 is covered with a support portion cover 27.

First Support Pillar Member 12

Figure 5:
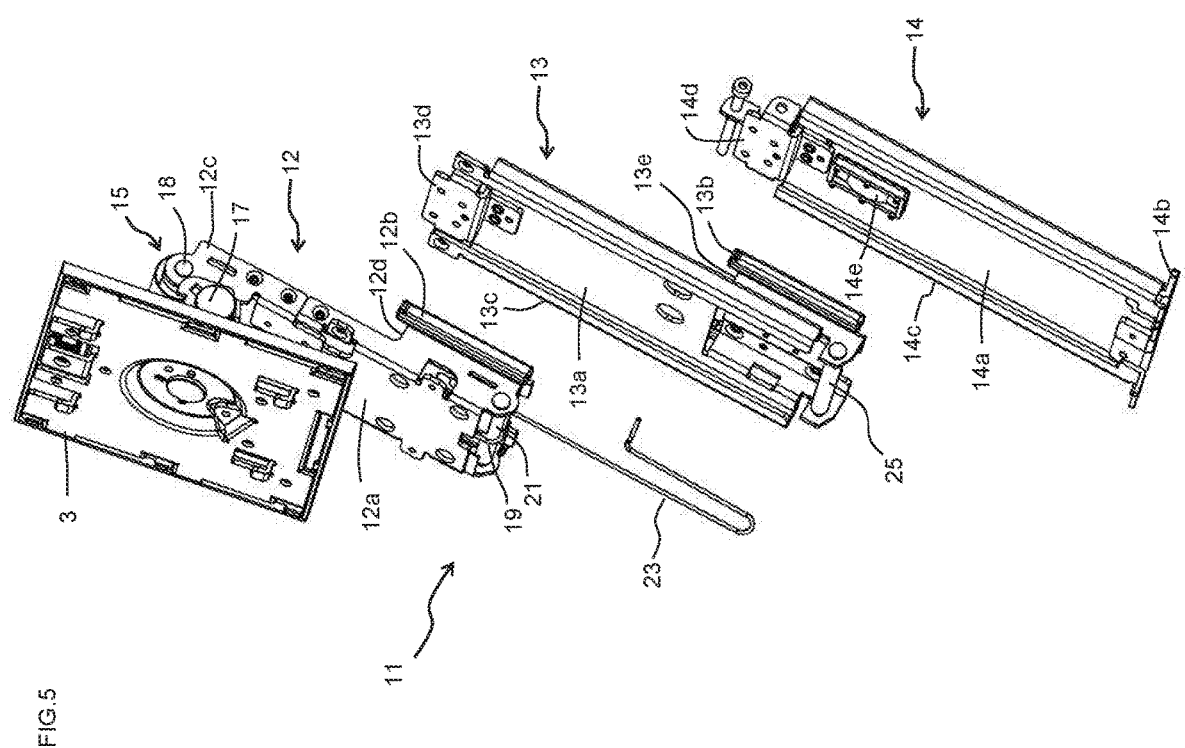
FIG. 5 is an exploded perspective view of the support portion 3 and the support pillar 11 as seen from the front side.

The first support pillar member 12 is described with reference to FIGS. 3A to 6 and 10A. The first support pillar member 12 is the closest support pillar member to the monitor 1. The first support pillar member 12 is plate-shaped. As shown in FIGS. 5 to 6, the first support pillar member 12 includes a base portion 12a and a slide portion 12b connected to the base portion 12a. A projecting wall 12d projecting in a thickness direction of the base portion 12a is provided in the base portion 12a. The slide portion 12b is provided in the projecting wall 12d. Therefore, the slide portion 12b is provided apart from the base portion 12a in the thickness direction of the base portion 12a. The slide portion 12b is provided in a vicinity of the lower end of the base portion 12a.

A bracket 12c is fixed in the base portion 12a. The bracket 12c is provided near an upper end of the base portion 12a. The tilt hinge 17 connects the bracket 12c and the support portion 3. The bracket 12c supports a constant load spring support shaft 18. The constant load spring 15 is formed by winding the spring portion 15b around a drum 15a including a central opening. The first support pillar member 12 supports the constant load spring 15 by inserting the constant load spring support shaft 18 into the central opening of the drum 15a. With this configuration, the constant load spring 15 is supported near the tilt hinge 17.

More specifically, the constant load spring 15 is supported at a position where the constant load spring 15 partially or completely overlaps the tilt hinge 17 when viewed in a direction in which the support pillar 11 extends and shortens. Since the constant load spring 15 is relatively large, not only an appearance of the monitor stand is impaired depending on its arrangement but also the constant load spring 15 interferes when the first to third support pillar members 12 to 14 slide one another. However, since the tilt hinge 17 is relatively large, by arranging the constant load spring 15 in a vicinity of the tilt hinge 17, it becomes possible to arrange the constant load spring 15 without noticeable. Also, in a vicinity of the tilt hinge 17, since interference with the first to third support pillar members 12 to 14 is unlikely to occur at the time of sliding of the first to third support pillar members 12 to 14, each stroke of the first to third support pillar members 12 to 14 can be increased. Furthermore, the constant load spring 15 is preferably arranged on an upper side of the tilt hinge 17. In this case, since a distance between the constant load spring 15 and a first turning portion 21 becomes long, the stroke of the first support pillar member 12 can be lengthened. One end of a first interlocking member 19 is connected to an open end 15d of the spring portion 15b. The first interlocking member 19 is an elongated member that can be bent, and is composed of a wire, a tape, or the like. The other end of the first interlocking member 19 is connected to the second support pillar member 13.

A first turning portion 21 is provided in the base portion 12a. The first turning portion 21 is provided near the lower end of the base portion 12a. The first interlocking member 19 is turned in the first turning portion 21. The first turning portion 21 may have a configuration capable of turning the first interlocking member 19. The first turning portion 21 is preferably a pulley, but the first turning portion 21 may be a columnar or cylindrical column.

One end of a second interlocking member 23 is connected to the slide portion 12b. The second interlocking member 23 is connected to substantially the center of the slide portion 12b. The second interlocking member 23 is an elongated member that can be bent, and is composed of a wire, a tape, or the like. The other end of the second interlocking member 23 is connected to the third support pillar member 14.

The first support pillar member 12 is covered with a side cover 29, a front cover 31, and a back cover 33. The side cover 29 covers a side of the first support pillar member 12. The front cover 31 covers a front side of the first support pillar member 12. The back cover 33 covers a back side of the first support pillar member 12.

Second Support Pillar Member 13

The second support pillar member 13 is described with reference to FIGS. 3A to 6 and 10A. The second support pillar member 13 is a support pillar member adjacent to the first support pillar member 12. The second support pillar member 13 is plate-shaped. The second support pillar member 13 includes a base portion 13a and a slide portion 13b connected to the base portion 13a. The base portion 13a is provided with a projecting wall 13e projecting in a thickness direction of the base portion 13a. The slide portion 13b is provided in the projecting wall 13e. Therefore, the slide portion 13b is provided apart from the base portion 13a in the thickness direction of the base portion 13a. The slide portion 13b is provided near a lower end of the base portion 13a.

Rail portions 13c are provided at both edges of the base portion 13a. Both edges of the slide portion 12b are inserted into the rail portions 13c, and the slide portion 12b slides along the rail portion 13c so that the first support pillar member 12 and the second support pillar member 13 can slide with respect to one another.

A stopper portion 13d is provided in the base portion 13a. The stopper portion 13d is provided near an upper end of the base portion 13a. When the first support pillar member 12 and the second support pillar member 13 slide with respect to one another so that the slide portion 12b comes closer to the stopper portion 13d, the slide portion 12b contacts the stopper portion 13d. Further sliding is prevented when the slide portion 12b contacts the stopper portion 13d.

The other end of the first interlocking member 19 is connected to the stopper portion 13d. Therefore, the first interlocking member 19 is connected to the stopper portion 13d via the open end 15d of the spring portion 15b and the first turning portion 21.

A second turning portion 25 is provided in the base portion 13a. The second turning portion 25 is provided near the lower end of the base portion 13a. The second interlocking member 23 is turned in the second turning portion 25. The second turning portion 25 may have a configuration capable of turning the second interlocking member 23. The second turning portion 25 is preferably a pulley, but the second turning portion 25 may be a columnar or cylindrical column.

The second support pillar member 13 is covered with a side cover 35 and a front cover 37. The side cover 35 covers a side of the second support pillar member 13 and a back side of the second support pillar member 13. The front cover 37 covers a front side of the second support pillar member 13. The front cover 37 is formed with a cutout portion 37a that prevents the front cover 37 from interfering with the first support pillar member 12 when the first support pillar member 12 and the second support pillar member 13 slide with respect to one another. Interference between the front cover 37 and the first support pillar member 12 is avoided by the projecting wall 12d entering the cutout portion 37a.

Third Support Pillar Member 14

The third support pillar member 14 is described with reference to FIGS. 3A to 6 and 10A. The third support pillar member 14 is a support pillar member adjacent to the second support pillar member 13. The third support pillar member 14 is plate-shaped. The third support pillar member 14 includes a base portion 14a and a base mounting portion 14b connected to the base portion 14a. The base mounting portion 14b protrudes in a thickness direction of the base portion 14a. The base mounting portion 14b is provided at a lower end of the base portion 14a. The base mounting portion 14b attaches the support pillar 11 to the base 9.

Rail portions 14c are provided at both edges of the base portion 14a. Both edges of the slide portion 13b are inserted into the rail portion 14c, and the slide portion 13b slides along the rail portion 14c so that the second support pillar member 13 and the third support pillar member 14 can slide with respect to one another.

A stopper portion 14d is provided in the base portion 14a. The stopper portion 14d is provided near an upper end of the base portion 14a. When the second support pillar member 13 and the third support pillar member 14 slide with respect to one another so that the slide portion 13b comes closer to the stopper portion 14d, the slide portion 13b contacts the stopper portion 14d. Further sliding is prevented when the slide portion 13b contacts the stopper portion 14d.

A resistance generating portion 14e is provided in the base portion 14a. Since the resistance generating portion 14e is provided to contact the slide portion 13b, a resistance is generated in the resistance generating portion 14e when the resistance generating portion 14e and the slide portion 13b slide with respect to one another. As described later, in the present embodiment, the constant load spring 15 is selected based on the viewpoint of whether forces applied to the first support pillar member 12 balance an elastic force of the constant load spring 15. Here, these forces may be slightly unbalanced by variations of various members of the monitor stand. In such a case, the position of monitor 1 slowly rises or falls. Therefore, in the present embodiment, sliding resistance is intentionally generated by providing the resistance generating portion 14e. In such a configuration, unintentional displacement of the monitor 1 is suppressed even when the balance of forces is slightly collapsed.

The other end of the second interlocking member 23 is connected to the stopper portion 14d. Therefore, the second interlocking member 23 is connected to the stopper portion 14d via the slide portion 12b and the second turning portion 25.

The third support pillar member 14 is covered with a side cover 39 and a front cover 41. The side cover 39 covers a side of the third support pillar member 14 and a back side of the third support pillar member 14. The front cover 41 covers a front side of the third support pillar member 14. The front cover 41 is formed with a cutout portion 41a that prevents the front cover 41 from interfering with the second support pillar member 13 when the second support pillar member 13 and the third support pillar member 14 slide with respect to one another. Interference between the front cover 41 and the second support pillar member 13 is avoided by the projecting wall 13e entering the cutout portion 41a.

Balance of Forces

The balance of forces related to the first support pillar member 12 and the second support pillar member 13 is described below. The following explanation is a rough explanation ignoring weight and sliding resistance of the support pillar members.

First, a relationship between a force applied to the second support pillar member 13 and a force applied to the member related to the second support pillar is described below. Assuming that a force that the second support pillar member 13 is pulled by the first interlocking member 19 is F1, the second turning portion 25 applies F1 to the second interlocking member 23. Since the second interlocking member 23 supporting the second turning portion 25 is connected to the first support pillar member 12 and the third support pillar member 14, a tension corresponding to F1/2 is generated in the second interlocking member 23 and the forces applied to the second support pillar member 13 is balanced.

Second, a relationship between a force applied to the first support members 12 and a force applied to the member related to the first support members 12 is described below. The tension applying to the first interlocking member 19 is F1 and the tension applying to the second interlocking member 23 is F1/2. Supposing that a force in the direction in which the support pillar 11 extends and shortens caused by a weight of the monitor 1 is M, the force F1 that the first interlocking member 19 pulls the constant load spring 15 downward, the force F1/2 that the second interlocking member 23 pulls the first support pillar member 12 downward, and the force M caused by the weight of the monitor 1 are applied to the first turning portion 21.

A force applied by the first turning portion 21 to the first interlocking member 19 is F1+F1/2+M. Since, a half of the force, which is applied by the first turning portion 21 to the first interlocking member 19, is equal to the tension working to the first interlocking member 19, F1=(F1+F1/2+M)/2 and F1=2M are satisfied. Therefore, by applying the constant load spring 15 having the elastic force of 2M to the monitor stand, the balance of forces is maintained regardless of how the first and second support pillar members 12, 13 slide, and the monitor stand can exhibit a free stop function.

Work of the Monitor Stand

When a user wants to lower the position of monitor 1, the user applies a downward force to the monitor 1. While this force is applied to the monitor 1, a downward force applied to the first support pillar member 12 is larger than an upward force applied to the first support pillar member 12, so the first support pillar member 12 moves downward while the spring portion 15b becomes longer. When the first support pillar member 12 moves downward, a downward force applied to the second support pillar member 13 becomes larger than the upward force applied to the second support pillar member 13. And the second support pillar member 13 moves downward. Also, when the first support pillar member 12 moves downward by a length L, the position of the second turning portion 25 moves downward by a length L/2, so the position of the second support pillar member 13 also moves downward by the length L/2. Therefore, when the first support pillar member 12 move downward by the length L, a sliding distance (relative movement distance) between the first support pillar member 12 and the second support pillar member 13 and a sliding distance between the second support pillar member 13 and the third support pillar member 14 are both the length L/2. Therefore, as shown in FIGS. 2A to 2C, when the user lowers the monitor 1, the first support pillar member 12 and the second support pillar member 13 move downward equally at the same time.

After the user lowers the monitor 1 to the desired position and releases his hands from the monitor 1, the forces applied to first support pillar member 12 and second support pillar member 13 are balanced. In this way, the monitor stand exhibits the free stop function to maintain the monitor 1 in the desired position.

When the user wants to raise the position of monitor 1, the user applies an upward force to the monitor 1. While this force is applied to the monitor 1, an upward force applied to the first support pillar member 12 becomes larger than a downward force applied to the first support pillar member 12, so the first support pillar member 12 moves upward while the spring portion 15b become shorter. When the first support pillar member 12 moves upward, an upward force applied to the second support pillar member 13 becomes larger than a downward force applied to the second support pillar member 13. And the second support pillar member 13 moves upward. Also, when the first support pillar member 12 moves upward by the length L, the position of the second turning portion 25 increases by the length L/2, so that the position of the second support pillar member 13 also increases by length L/2. Therefore, when the first support pillar member 12 rises by the length L, the sliding distance between the first support pillar member 12 and the second support pillar member 13 and the sliding distance between the second support pillar member 13 and the third support pillar member 14 are both the length L/2. Therefore, as shown in FIGS. 2A to 2C, when the user raises the monitor 1, the first support pillar member 12 and the second support pillar member 13 move upward equally at the same time.

As described above, in the present embodiment, the first support pillar member 12 and the second support pillar member 13 interlock and the first support pillar member 12 and the second support pillar member 13 slide with respect to the third support pillar member 14. In such a configuration, the following effects are exhibited.

When the monitor 1 is in an upper limit position, the first to third support pillar members 12 to 14 are arranged to be offset from one another, so the support pillar 11 is thin and excellent in aesthetic appearance. In other words, as shown in FIGS. 2A to 2C, assuming the depth of the support pillar 11 when the monitor 1 is in the upper limit position, a middle position, and a lower limit position is D1, D2, D3, respectively, a relation D1<D2<D3 is satisfied. The depth of the support pillar 11 decreases with the extension of the support pillar 11. In such a configuration, the depth of the support pillar 11 decreases with rise of the monitor 1, the support pillar 11 becomes inconspicuous, and the appearance of the monitor stand improves. With the conventional support pillar comprising telescope structure, the support pillar is conspicuous especially when the monitor is in a high position, since the depth of the support is constant regardless of the position of the monitor. On the other hand, in the present embodiment, since the depth of the support pillar 11 decreases with the rise of the monitor 1, the support pillar 11 is inconspicuous even when the monitor 1 is in the high position. Thus, an effect of improving appearance is remarkable in the present embodiment.

When the monitor 1 is in the lower limit position, the first to third support pillar members 12 to 14 appears as one mass, so the monitor stand has a stylish appearance.

Since the monitor stand is a two-stage interlocking lift type, the user can operate the monitor stand in the same sense as a one-step lift type.

The monitor stand can increase the upper limit position of the monitor 1 and also decrease the lower limit position of the monitor 1.

Since the tilt hinge 17 is close to the main body of the monitor 1, the user can intuitively adjust a tilt of monitor 1.

Inclination of the Support Pillar 11

In the present embodiment, the support pillar 11 is inclined rearward (in a direction away from the user). As shown in FIG. 7A, by inclining the support pillar 11, a position where the support pillar 11 is fixed to the base 9 closes to a position where the vertical line V passing through a center of gravity G of a structure consisting of the monitor stand and the monitor 1 crosses the base 9. As a result, even when a depth of the desk on which the monitor stand is arranged is small, a distance between the monitor 1 and the user is long. Further, by inclining the support pillar 11, it is possible to decrease a depth D of the support pillar 11 when the monitor 1 is at the upper limit position. For example, the depth D in the state of FIG. 7A is 45 mm and the depth D in the state of FIG. 7B is 49 mm.

Preferably, in the state where the monitor 1 is in the upper limit position, a line connecting uppermost points on a back side of each of the first to third support pillar members 12 to 14 (each of the side covers 29, 35, 39) is perpendicular to the base 9. This configuration decreases the depth of the support pillar 11 when the monitor 1 is in the upper limit position.

Figure 8:
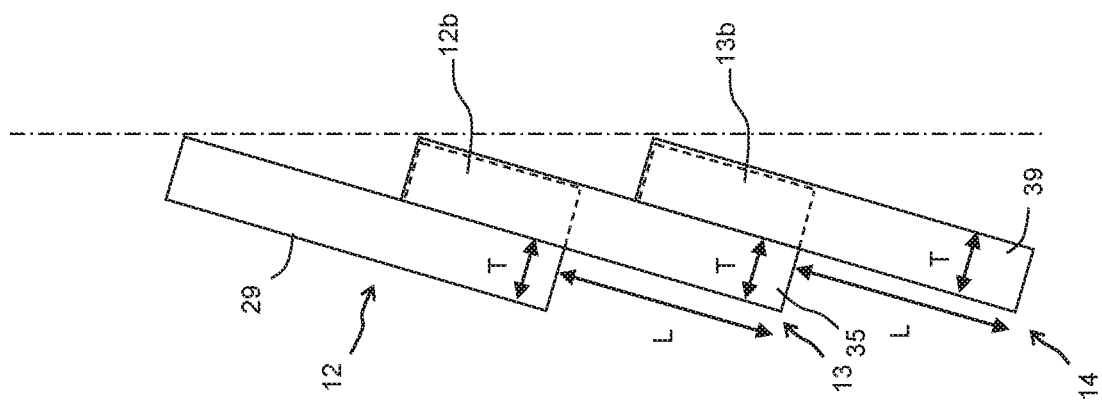
FIG. 8 is a diagram of a method of calculating an inclination angle of the support pillar 11.

Preferably, as shown in FIG. 8. an inclination angle of the support pillar 11 with respect to the vertical direction is $\alpha \times (\tan^{-1}(T/L))$.

Here, $\alpha$ is from 0.8 to 1.2.

T is a thickness of the first to third support pillar members 12 to 14 (the side covers 29, 35, 39).

L is a stroke corresponding to the sliding distance in which the monitor 1 slides from the lower limit position of the monitor 1 to the upper limit position of the monitor 1.

This configuration decreases a thickness of the support pillar 11 when the monitor 1 is in the upper limit position, since the line connecting uppermost points on the back side of each of the first to third support pillar members 12 to 14 is almost perpendicular to the base 9. Preferably, a is from 0.9 to 1.1.

Arrangement of the First to Third Support Pillar Members 12 to 14

In the present embodiment, the first to third support pillar members 12 to 14 are arranged in order from the support pillar member closer to the monitor 1. And the positions of the first to third support pillar members 12 to 14 are set to be higher in this order. Namely, the support pillar member closer to monitor 1 is configured to be higher position. Such a configuration has the following effects.

Since the support portion 3 does not interfere with the first to third support pillar members 12 to 14, a lift range of the monitor 1 can be widened.

When the user tilts the monitor 1 in the portrait orientation, the monitor 1 does not easily interfere with the first to third support pillar members 12 to 14, so the tilt range of the monitor 1 can be widened.

When the user raises the monitor 1, the first and second support pillar members 12 and 13 extend rearward, so the increase of the depth of the support pillar 11 is suppressed.

Figure 9:
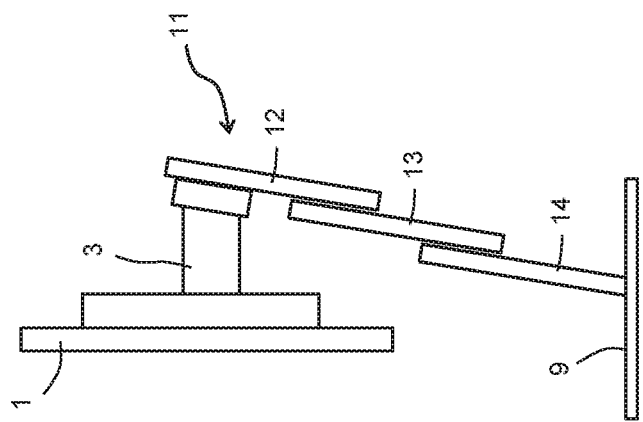
FIG. 9 is a right-side view for explaining the problem when a support pillar member having a greater distance from the monitor 1 is arranged to a higher position.

On the other hand, as shown in FIG. 9, in a case that the support pillar member having a greater distance from the monitor 1 is arranged to a higher position, it is necessary to lengthen the depth of the support portion 3 in order to prevent the monitor 1 from interfering with the support pillar 11 when the user tilts the monitor 1. Therefore, a full depth of the monitor stand also increases.

And in such a configuration, it is difficult to increase the stroke of the first support pillar member 12, since the support portion 3 interferes with the second support pillar member 13 when the user lowers the first support pillar member 12.

Shapes of the First to Third Support Pillar Members 12 to 14

A ratio of a thickness of the first support pillar member 12 and the second support pillar member 13 with respect to a thickness of the third support pillar member 14 is preferably 0.5 to 2, more preferably 0.8 to 1.2, much more preferably 0.9 to 1.1. In such a configuration, the thicknesses of first to third support pillar members 12 to 14 approach a constant value. Thus, this configuration is excellent in aesthetic appearance.

A ratio of a length of the first support pillar member 12 and the length of the second support pillar member 13 with respect to a length of the third support pillar member 14 is preferably 0.5 to 2, more preferably 0.8 to 1.2, much more preferably 0.9 to 1.1. In such a configuration, the lengths of first to third support pillar members 12 to 14 approach a constant value. Thus, this configuration is excellent in aesthetic appearance.

A ratio of a width of the first support pillar member 12 and the second pillar member with respect to a width of the third support pillar member 14 is preferably 0.5 to 2, more preferably 0.8 to 1.2, much more preferably 0.9 to 1.1. In such a configuration, the widths of first to third support pillar members 12 to 14 approach a constant value. Thus, this configuration is excellent in aesthetic appearance.

Arrangements and Shapes of the Side Covers 29, 35, 39

The side covers 29, 35, 39 provided corresponding to the first to third support pillar members 12 to 14 are disposed to overlap one another. A ratio of a thickness of the side covers 29, 35 with respect to a thickness of the side cover 39 is preferably 0.5 to 2, more preferably 0.8 to 1.2, and much more preferably 0.9 to 1.1. In such a configuration, the thicknesses of the side covers 29, 35, 39 approach a constant value. Thus, this configuration is excellent in aesthetic appearance.

A ratio of a length of the side covers 29, 35 with respect to a length of the side cover 39 is preferably 0.5 to 2, more preferably 0.8 to 1.2, and much more preferably 0.9 to 1.1. In such a configuration, the lengths of the side covers 29, 35, 39 approach a constant value. Thus, this configuration is excellent in aesthetic appearance.

A ratio of a width of the side covers 29, 35 with respect to a width of the side cover 39 is preferably 0.5 to 2, more preferably 0.8 to 1.2, and much more preferably 0.9 to 1.1. In such a configuration, the widths of the side covers 29, 35, 39 approach a constant value. Thus, this configuration is excellent in aesthetic appearance.

Interference Avoidance Shape of the Front Cover

As shown in FIGS. 10A to 10D, since the first interlocking member 19 is fixed to the second support pillar member 13, the first interlocking member 19 is connected to the second support pillar member 13 via the first turning portion 21 with the first interlocking member 19 tilted. Therefore, when the user lowers the monitor 1, the first interlocking member 19 may interfere with the front cover 37 of the second support pillar member 13. There are similar problems with the second interlocking member 23 and the front cover 41 of the third support pillar member 14. Therefore, in this embodiment, in order to avoid interference between the interlocking members 19, 23 and the front cover 37, 41, the interference avoidance shape is provided in the front cover 37, 41 at the portion indicated by the dotted line in FIG. 11A. In the present embodiment, the interference avoidance shape is a concave curved surface shape. According to such a configuration, even if the first to third support pillar members 12 to 14 are all brought close to each other, the above interference is unlikely to occur, the monitor stand can be decreased the depth D of the support pillar 11.

On the other hand, in a case that the interference avoidance shape is not provided in the front covers 37, 41, it is necessary to increase clearances between the first to third support pillar members 12 to 14 in order to avoid the above interference. As a result, the depth D of the support pillar 11 increases.

2. Second Embodiment

The second embodiment is described with reference to FIG. 10B. This embodiment is similar to the first embodiment, and a main difference is a difference in the configuration of the interlocking portion. The main difference is mainly described below.

As shown in FIG. 10B, in this embodiment, the constant load spring 15 is provided in a vicinity of a lower end of the first support pillar member 12. And the spring portion 15b of the constant load spring 15 is directly connected to the second support pillar member 13. In such a configuration, when the first support pillar member 12 is raised and lowered, the second support pillar member 13 moves up and down in conjunction therewith, so that the interlocking portion of this embodiment functions in the same manner as the interlocking portion of the first embodiment. According to this configuration, since the first turning portion 21 and the first interlocking member 19 are unnecessary, the number of parts of the monitor stand can be reduced.

3. Third Embodiment

The third embodiment is described with reference to FIG. 10C. This embodiment is similar to the first embodiment, and a main difference is a difference in the configuration of the interlocking portion. The main difference is mainly described below.

The interlocking portion of this embodiment corresponds to a configuration in which the interlocking portion of the first embodiment is rotated by 180 degrees. The constant load spring 15 is provided adjacent to the third support pillar member 14. The first turning portion 21 is provided near an upper end of the third support pillar member 14. The first interlocking member 19 is connected to a vicinity of a lower end of the second support pillar member 13 via the open end 15*d* and via the first turning portion 21.

The second turning portion 25 is provided near an upper end of the second support pillar member 13. The second interlocking member 23 is connected to a vicinity of a lower end of the first support pillar member 12 via a vicinity of the upper end of the third support pillar member 14 and via the second turning portion 25. Even in such a configuration, when the user raises and lowers the first support pillar member 12, the second support pillar member 13 moves up and down in conjunction therewith, so that the interlocking portion of this embodiment functions in the same manner as the interlocking portion of the first embodiment.

3. Fourth Embodiment

The fourth embodiment is described with reference to FIG. 10D. This embodiment is similar to the first embodiment, and a main difference is a difference in the configuration of the interlocking portion. The main difference is mainly described below.

In the present embodiment, the interlocking of the first support pillar member 12 and the second support pillar member 13 is realized by a rack and pinion mechanism. The first support pillar member 12 and the third support pillar member 14 are provided with rack gears 12*r*, 14*r*, respectively. A pinion gear 13*p* is provided with the second support pillar member 13. The rack gears 12*r* and 14*r* engage with the pinion gear 13*p*. Although not shown, in the present embodiment, the constant load spring 15 and the first interlocking member 19 are arranged in the same manner as in any one of FIGS. 10A to 10O. In such a configuration, when the user raises and lowers the first support pillar member 12, the pinion gear 13*p* rotates with a moving of the rack gear 12*r*. Rotation of the pinion gear 13*p* is transmitted to the rack gear 14*r*, and the second support pillar member 13 and the third support pillar member 14 slide with respect to each another. Since the third support pillar member 14 is immovable, the second support pillar member 13 moves up and down. Therefore, the interlocking portion shown in FIG. 10D functions in the same manner as the interlocking portion of the first embodiment.

5. Fifth Embodiment

As shown in FIGS. 12A to 12D, this embodiment is characterized in that the support pillar 11 is inclined in a direction approaching the user, and that the support pillar member having a greater distance from the monitor 1 is arranged to a higher position. In this configuration, there is a problem that the support portion cover 27 interferes with the second support pillar member 13 and the third support pillar member 14 when the monitor 1 is lowered.

Therefore, in this embodiment, in order to avoid this interference, cutouts 13*s*, 14*p* are formed in the second support pillar member 13 and the third support pillar member 14. Thus, when the user lowers the monitor 1, the support portion cover 27 enters cutouts 13*s*, 14*p*.

DESCRIPTION OF REFERENCE SIGNS

1: monitor
3: support portion
9: base
11: support pillar
12: first support pillar member
12*a*: base portion
12*b*: slide portion
12*c*: bracket
12*d*: projecting wall
12*r*: rack gear
13: second support pillar member
13*a*: base portion
13*b*: slide portion
13*c*: rail portion
13*d*: stopper portion
13*e*: projecting wall
13*p*: pinion gear
14: third support pillar member
14*a*: base portion
14*b*: pedestal mounting portion
14*c*: rail portion
14*d*: stopper portion
14*e*: resistance generating portion
14*r*: rack gear
15: constant load spring
15*a*: drum
15*b*: spring portion
15*d*: open end
17: tilt hinge
18: constant load spring support shaft
19: first interlocking member
21: first turning portion
23: second interlocking member
25: second turning portion
27: support portion cover
29: side cover
31: front cover
33: back cover
35: side cover
37: front cover
37*a*: cutout portion
39: side cover
41: front cover
41*a*: cutout portion

The invention claimed is:

1. A monitor stand comprising:
    a support portion supporting a monitor;
    a base contacting a placing plane; and
    a support pillar connecting the support portion and the base, wherein
    the support pillar includes a plurality of support pillar members provided to overlap one another and the plurality of support pillar members being configured to be slidable with respect to one another, the plurality of the support pillar members including a plurality of pairs, each of the pairs having two support pillar members being provided to overlap one another and being configured to be slidable with respect to one another,
    the support portion is provided in a first support pillar member which is one of the plurality of the support pillar members,
    the support pillar includes an interlocking portion configured to extend and shorten the support pillar by sliding the two support pillar members of each of the pairs with respect to one another,
    the interlock portion is configured to keep a position of the monitor at a desired position by an urging force of a constant load spring which includes a spring portion.

2. The monitor stand of claim 1, wherein
    the support pillar is configured so that a depth of the support pillar decreases with an extension of the support pillar.

3. The monitor stand of claim 1, wherein
the interlock portion is configured to interlock the plurality of the support pillar members so that the first support pillar member is positioned higher than other support pillar members.

4. The monitor stand of claim 1, wherein
the interlock portion is configured so that sliding distances between any adjacent two support pillar members of the plurality of the support pillar members are equal when the monitor is raised and lowered.

5. The monitor stand of claim 1, wherein
the plurality of the support pillar members include the first support pillar member, a second support pillar member, and a third support pillar member in order from the monitor.

6. The monitor stand of claim 1, wherein
the constant load spring is supported by the first support pillar member,
an open end of the spring portion is connected directly or via another component to a second support pillar member which is provided adjacent to the first support pillar member.

7. The monitor stand of claim 1, wherein
the support portion is connected to the first support pillar member via a tilt hinge, and
the constant load spring is supported in a vicinity of the tilt hinge.

8. The monitor stand of claim 6, wherein
the open end of the spring portion is connected to the second support pillar member via a first interlock member including one end and an other end,
the one end of the first interlock member is connected to the open end of the spring portion,
the other end of the first interlock member is connected to the second support pillar member,
the first interlock member is turned at a first turning portion provided in the first support pillar member.

9. The monitor stand of claim 8, wherein the first turning portion is provided in a vicinity of a lower end of the first support pillar member.

10. The monitor stand of claim 8 further comprising:
a third support pillar member fixed to the base, the third support pillar member provided adjacent to the second support pillar member; and
a second interlocking member including one end and the other end, wherein
the one end of the second interlocking member is connected to the first support pillar member, the other end of the second interlocking member is connected to the third support pillar member,
the second interlocking member is turned at a second turning portion provided in the second support pillar member.

11. The monitor stand of claim 10, wherein
the second turning portion is provided in a vicinity of a lower end of the second support pillar member.

12. The monitor stand of claim 1, wherein
the support pillar is inclined to the base,
the support pillar is fixed to the base in a vicinity of the position where the base crosses a vertical line passing through a center of gravity of a structure consisting of the monitor stand and the monitor.

13. The monitor stand of claim 1, wherein
the interlock portion is configured to interlock the plurality of the support pillar members so that
the support pillar member closest to the monitor in the plurality of the support pillar members is positioned at a highest position, and
the support pillar member closest to the base in the plurality of the supporting pillar members is positioned at a lowest position.

14. The monitor stand of claim 1, wherein
the support pillar is inclined to the base,
in a state where the monitor is in an upper limit position, a line connecting uppermost points on a back side of each of the support pillar members is perpendicular to the base.

15. The monitor stand of claim 1, wherein
the support pillar is inclined to the base,
an inclination angle of the support pillar with respect to a vertical direction is 0.8 to $1.2 \times (\tan^{-1}(T/L))$,
T is a thickness of the support pillar member closest to the base in the plurality of the support pillar members, and
L is a stroke of
the support pillar member that is the second closest to the base in the plurality of the support pillar members with respect to
the support pillar member closest to the base in the plurality of the support pillar members.

16. The monitor stand of claim 1, wherein
when defining a thickness of the support pillar member closest to the base in the plurality of the support pillar members as a first thickness and
a thickness of all the other support members as a second thickness,
a ratio of the second thickness with respect to the first thickness is 0.5 to 2.

17. The monitor stand of claim 1, wherein
when defining a full length of the support pillar member closest to the base in the plurality of the support pillar members as a first length and
a full length of all the other support members as a second length,
a ratio of the second length with respect to the first length is 0.5 to 2.

18. The monitor stand of claim 1, wherein
the plurality of the support pillar members are plate-shaped.

19. The monitor stand of claim 1, wherein the interlocking portion is configured to extend and shorten the support pillar by simultaneously sliding the two support pillar members of each of the pairs with respect to one another.

* * * * *